US008856231B2

(12) United States Patent
Saito et al.

(10) Patent No.: US 8,856,231 B2
(45) Date of Patent: Oct. 7, 2014

(54) INFORMATION PROCESSING DEVICE AND METHOD, RECORDING MEDIUM, AND PROGRAM

(75) Inventors: Naoki Saito, Kanagawa (JP); Yusuke Sakai, Kanagawa (JP); Mikio Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 13/338,072

(22) Filed: Dec. 27, 2011

(65) Prior Publication Data

US 2012/0110081 A1 May 3, 2012

Related U.S. Application Data

(63) Continuation of application No. 11/658,476, filed as application No. PCT/JP2005/013291 on Jul. 20, 2005, now Pat. No. 8,099,460.

(30) Foreign Application Priority Data

Jul. 27, 2004 (JP) ................................ 2004-218529

(51) Int. Cl.

*G06F 15/16* (2006.01)
*H04N 7/14* (2006.01)
*G06F 3/048* (2013.01)
*G06F 3/00* (2006.01)
*H04L 29/06* (2006.01)
*H04N 5/272* (2006.01)

(52) U.S. Cl.

CPC ................ *H04L 67/38* (2013.01); *H04N 5/272* (2013.01); *H04L 65/403* (2013.01)
USPC ....... 709/204; 348/14.01; 348/14.1; 715/751; 715/753; 715/754

(58) Field of Classification Search

USPC .......................................................... 709/204
See application file for complete search history.

(56) References Cited

U.S. PATENT DOCUMENTS 5,107,443 A * 4/1992 Smith et al. .................. 715/751
5,444,476 A * 8/1995 Conway ....................... 348/14.1

(Continued)

FOREIGN PATENT DOCUMENTS

JP 04-328627 11/1992
JP 08-044490 * 2/1996 ............... G06F 3/14

(Continued)

OTHER PUBLICATIONS

Office Action mailed Jan. 20, 2011, in corresponding JP Application Publication No. 2004-218529 5,561,811.

*Primary Examiner* — David Lazaro
*Assistant Examiner* — Robert Shaw
(74) *Attorney, Agent, or Firm* — Oblon, Spivak, McClelland, Maier & Neustadt, L.L.P.

(57) ABSTRACT

An information processing apparatus, an information processing method, a recording medium, and a program for allowing communicating parties at remote locations to view the same displayed content and to point to desired positions on the displayed image of the content. A user A and a user B viewing themselves and the content on a cross-faded mode may point to desired positions on the content image with their fingertips. Motion vectors of the fingertips are then detected in particular areas extracted from the image in a manner containing the detected positions. The detected motion vectors are translated into a pointer for the user A and a pointer for the user B, the pointers being alpha-blended with the content image. The two pointers extracted from a single image are associated with the users A and B by use of different Cyber Codes attached to the fingertips of each user, for example.

16 Claims, 11 Drawing Sheets

(56) References Cited

U.S. PATENT DOCUMENTS

| | | | | |
|---|---|---|---|---|
| 5,561,811 | A * | 10/1996 | Bier | 710/5 |
| 5,600,775 | A * | 2/1997 | King et al. | 715/203 |
| 5,617,539 | A * | 4/1997 | Ludwig et al. | 709/205 |
| 5,767,897 | A * | 6/1998 | Howell | 348/14.07 |
| 5,977,968 | A * | 11/1999 | Le Blanc | 715/706 |
| 7,484,176 | B2 * | 1/2009 | Blattner et al. | 715/758 |
| 2002/0036617 | A1 * | 3/2002 | Pryor | 345/156 |
| 2002/0149617 | A1 * | 10/2002 | Becker | 345/751 |
| 2003/0038884 | A1 | 2/2003 | Matsushita et al. | |
| 2004/0103151 | A1 | 5/2004 | Ettinger et al. | |
| 2004/0109006 | A1 * | 6/2004 | Matthews | 345/619 |
| 2004/0155898 | A1 * | 8/2004 | Taguchi et al. | 345/723 |
| 2004/0193413 | A1 | 9/2004 | Wilson et al. | |
| 2004/0239653 | A1 | 12/2004 | Stuerzlinger | |
| 2005/0021618 | A1 | 1/2005 | Isozaki | |
| 2005/0164147 | A1 | 7/2005 | Legan | |
| 2006/0023949 | A1 | 2/2006 | Saito et al. | |
| 2006/0025998 | A1 | 2/2006 | Sakai et al. | |
| 2006/0026207 | A1 | 2/2006 | Sakai et al. | |
| 2006/0031682 | A1 | 2/2006 | Sakai et al. | |
| 2006/0184497 | A1 * | 8/2006 | Suzuki et al. | 707/1 |
| 2006/0238548 | A1 * | 10/2006 | Stotts, Jr. et al. | 345/629 |
| 2007/0174881 | A1 * | 7/2007 | Idehara et al. | 725/90 |

FOREIGN PATENT DOCUMENTS

| | | | | |
|---|---|---|---|---|
| JP | 08-211979 | | 8/1996 | |
| JP | 08-212327 | | 8/1996 | |
| JP | 09-116879 | * | 5/1997 | H04N 7/10 |
| JP | 09-163336 | | 6/1997 | |
| JP | 11-143677 | | 5/1999 | |
| JP | 2001-148841 | | 5/2001 | |
| JP | 2001-157184 | | 6/2001 | |
| JP | 2002-507027 | | 3/2002 | |
| JP | 2003-150529 | | 5/2003 | |
| JP | 2003-271530 | | 9/2003 | |
| JP | 2004-088327 | | 3/2004 | |
| WO | WO 99/46702 A1 | * | 3/1999 | |

* cited by examiner

INFORMATION PROCESSING DEVICE AND METHOD, RECORDING MEDIUM, AND PROGRAM

CROSS-REFERENCE TO RELATED APPLICATIONS

The present application claims priority to WIPO Application No. PCT/JP05/13291, filed Jul. 20, 2005. The present application also claims priority to the U.S. application Ser. No. 11/658,476, filed Jan. 25, 2007. The entire contents of each of these documents are incorporated herein by reference.

BACKGROUND OF THE INVENTION

1. Technical Field

The present invention relates to an information processing apparatus, an information processing method, a recording medium, and a program. More particularly, the invention relates to an information processing apparatus, an information processing method, a recording medium, and a program for reproducing the same content as that reproduced by another information processing apparatus connected via a network, in such a manner as to display, on an image of the reproduced content, pointers of users of the connected apparatuses pointing to desired positions on the displayed image.

2. Background Art

There exist telephones, videophones, and videoconferencing systems which allow people at remote locations to communicate with one another (in what is called remote communication). Other ways of remote communication include connecting to the Internet using personal computers or like equipment to communicate in text chat or in video chat, the latter mode involving video and audio exchanges.

It has also been proposed that the parties in remote communication share virtual spaces and the same contents (songs, moving and still pictures) between them using personal computers or the like on the Internet (e.g., see Patent Document 1)

Meanwhile, there are techniques for allowing the communicating parties to point to specific positions or areas on the shared content image. Illustratively, CCD (charge coupled device) cameras or like devices are used to detect the communicating parties' hand motions, and the detected motions are translated into movements of pointers such as cursors on the display screen (e.g., see Patent Document 2)

[Patent Document 1] Japanese Patent Laid-open No. 2003-271530

[Patent Document 2] Japanese Patent Laid-open No. Hei 8-44490

DISCLOSURE OF THE INVENTION

Problems to be Solved by the Invention

In typical remote communication setups, it has been difficult for communicating parties to share their experiences or ambient conditions thereby to enhance the feeling of mutual understanding or of relaxation. As a result, the tone of communication has tended to be overtly businesslike or even awkward. Making the style of communication livelier and more empathic has thus been difficult to achieve. Illustratively, the communicating parties could not point to specific positions or areas on an image of the shared content and felt frustrated at being unable to better express what they wanted to convey.

The present invention has been made in view of the above circumstances and provides arrangements for allowing communicating parties at remote locations to share the same content and to point to desired positions on a displayed image of the shared content.

Means for Solving the Problems

In carrying out the present invention and according to one embodiment thereof, there is provided an information processing apparatus for communicating with another information processing apparatus via a network, the information processing apparatus including: reproduction means configured to reproduce synchronously the same content data as that reproduced by that another information processing apparatus; input means configured to input a first user image obtained by imaging a user of the information processing apparatus; receiver means configured to receive a second user image which is obtained by imaging a user of that another information processing apparatus and which is sent from that another information processing apparatus through the network; extraction means configured to extract from at least one of the first and the second image users a pointer representing the user pointing to a desired position on the image; and composite means configured to composite the pointer extracted by the extraction means onto an image of the content data reproduced synchronously by the reproduction means.

Preferably, the composite means may composite the pointer extracted by the extraction means together with information for identifying the user represented by the pointer, onto the image of the content data reproduced synchronously by the reproduction means.

The composite means may preferably composite through alpha-blending the pointer extracted by the extraction means onto the image of the content data reproduced synchronously by the reproduction means.

Preferably, the information processing apparatus may further include motion vector detection means configured to detect a motion vector from at least one of the first and the second user images; wherein the extraction means may extract the pointer based on the motion vector.

If at least one of the first and the second user images includes a plurality of users, the extraction means may preferably extract a plurality of pointers representing the plurality of users pointing to desired positions on the image.

The extraction means may preferably associate the extracted plurality of pointers with one of the plurality of users.

According to another embodiment of the present invention, there is provided an information processing method for use with an information processing apparatus communicating with another information processing apparatus through a network, the information processing method including the steps of: reproducing synchronously the same content data as that reproduced by that another information processing apparatus; inputting a first user image obtained by imaging a user of the information processing apparatus; receiving a second user image which is obtained by imaging a user of that another information processing apparatus and which is sent from that another information processing apparatus through the network; extracting from at least one of the first and the second user images a pointer representing the user pointing to a desired position on the image; and compositing the pointer extracted in the extracting step onto an image of the content data reproduced synchronously in the reproducing step.

According to a further embodiment of the present invention, there is provided a recording medium which records a program in a manner readable by a computer for execution on an information processing apparatus communicating with another information processing apparatus through a network, the program including the steps of: reproducing synchronously the same content data as that reproduced by that another information processing apparatus; inputting a first user image obtained by imaging a user of the information processing apparatus; receiving a second user image which is obtained by imaging a user of that another information processing apparatus and which is sent from that another information processing apparatus through the network; extracting from at least one of the first and the second user images a pointer representing the user pointing to a desired position on the image; and compositing the pointer extracted in the extracting step onto an image of the content data reproduced synchronously in the reproducing step.

According to an even further embodiment of the present invention, there is provided a program for use by a computer working with an information processing apparatus communicating with another information processing apparatus through a network, the program causing the computer to execute a procedure including the steps of: reproducing synchronously the same content data as that reproduced by that another information processing apparatus; inputting a first user image obtained by imaging a user of the information processing apparatus; receiving a second user image which is obtained by imaging a user of that another information processing apparatus and which is sent from that another information processing apparatus through the network; extracting from at least one of the first and the second user images a pointer representing the user pointing to a desired position on the image; and compositing the pointer extracted in the extracting step onto an image of the content data reproduced synchronously in the reproducing step.

According to the present invention, as outlined above, a pointer representing a user pointing to a desired position is extracted from at least one of a first and a second user image, one showing the user of one information processing apparatus and the other the user of another information processing apparatus. The extracted pointer is composite onto the image of the content being reproduced synchronously by the two apparatuses.

Effect of the Invention

With the inventive arrangements above in use, communicating parties at remote locations can view and listen to the same content being displayed and can point to particular positions on the content image.

DESCRIPTION OF REFERENCE NUMERALS

Figure 1:
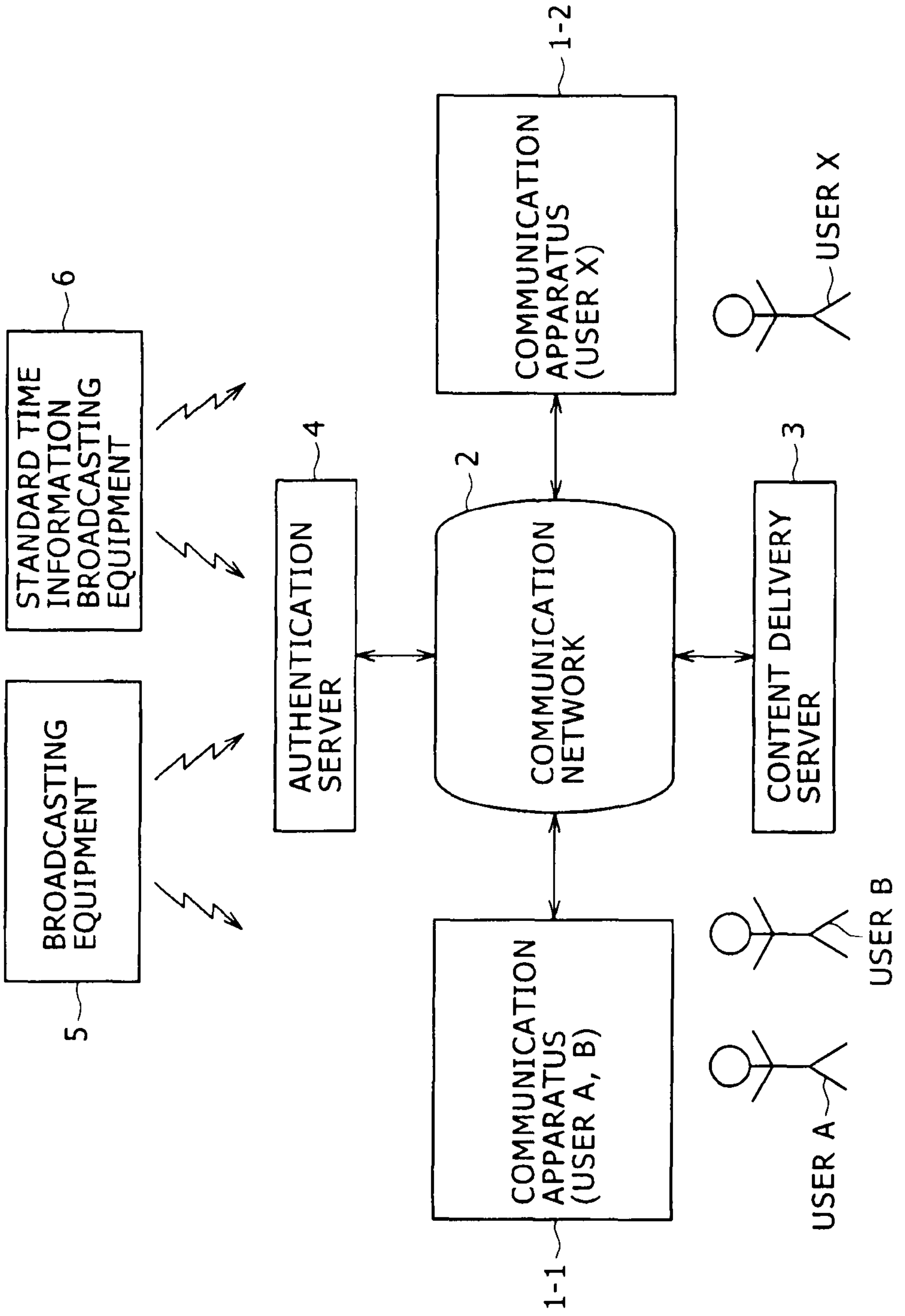
FIG. 1 is a schematic view showing a typical configuration of a communication system according to the present invention.

In the description that follows, reference numeral 1 stands for a communication apparatus; 2 for a communication network; 3 for a content delivery server; 4 for an authentication server; 5 for broadcasting equipment; 6 for standard time information delivery equipment; 21 for an output section; 22 for a display; 23 for a speaker; 24 for an input section; 25 for a camera; 26 for a microphone; 27 for a sensor; 28 for a communication section; 29 for a broadcast receiver section; 30 for a content reproduction section; 31 for a video-audio composite section; 32 for a storage section; 33 for contents; 34 for composite information; 35 for an image analysis section; 36 for a mirror image creation unit; 37 for a pointer detection unit; 38 for a motion vector detection unit; 39 for a matching unit; 40 for a communication environment detection section; 41 for a standard time keeping section; 42 for an operation input section; 43 for a control section; 44 for a session management unit; 45 for an audio-video recording level setting unit; 46 for a reproduction synchronization unit; 47 for a composite control unit; 48 for a reproduction authorization unit; 49 for a recording authorization unit; 50 for an operation information output unit; 51 for an electronic equipment control unit; 200 for a personal computer; 201 for a CPU; and 211 for a recording medium.

BEST MODE FOR CARRYING OUT THE INVENTION

The preferred embodiments of the present invention will now be described in detail with reference to the accompanying drawings.

FIG. 1 shows a typical configuration of a communication system according to the present invention. In this communication system, a communication apparatus 1-1 is connected to another communication apparatus 1 (i.e., communication apparatus 1-2 in FIG. 1) via a communication network 2. The two apparatuses communicate their users' voices and images therebetween in videophone fashion and synchronously reproduce common contents (e.g., TV broadcast programs, previously downloaded movies, moving and still pictures exchanged privately between users), thereby supporting communication between the remotely located users. In the description that follows, the two communication apparatuses 1-1 and 1-2 will be referred to generically as the communication apparatus 1 if there is no need to distinguish one from the other.

A plurality of users may utilize the communication apparatus 1. For example, the communication apparatus 1-1 in FIG. 1 is used by users A and B and the communication apparatus 1-2 by a user X.

Figure 2A:
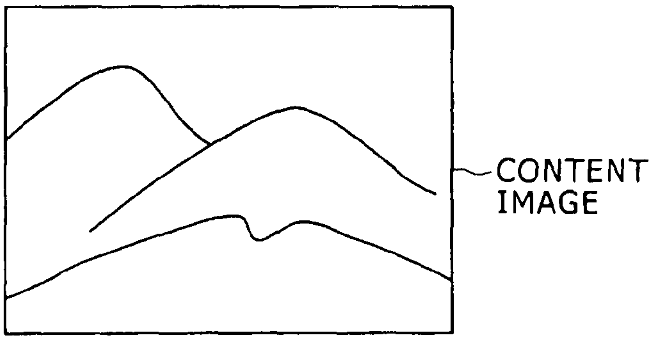
FIG. 2A is a schematic view giving a content-and-user image representation.
Figure 2B:
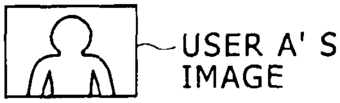
FIG. 2B is a schematic view giving another content-and-user image representation.
Figure 2C:
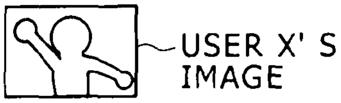
FIG. 2C is a schematic view giving another content-and-user image representation.

Illustratively, it is assumed that a common content image is given as shown in FIG. 2A, that an image of the user A picked up by the communication apparatus 1-1 appears as shown in FIG. 2B, and that an image of the user X picked up by the communication apparatus 1-2 is provided as shown in FIG. 2C. Under these assumptions, a display 22 (FIG. 4) of the communication apparatus 1-1 displays a content-and-user composite image in picture-in-picture mode as shown in FIG. 3A, in cross-fade mode as shown in FIG. 3B, or in wipe mode as shown in FIG. 3C.

Figure 3A:
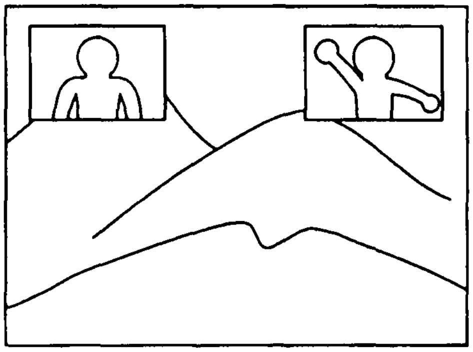
FIG. 3A is a schematic view showing a composite image of content and users.

In the picture-in-picture mode of FIG. 3A, small-sized user images are superposed as small-sized screens onto the content image. The positions and sizes of the small-sized screens are discretionary. Either one of the two images, i.e., image of the user A or of the communicating party (user X), may be displayed instead of both images being displayed simultaneously. As another alternative, the content image may be arranged to appear transparent through the users' small-sized screens in so-called alpha-blending mode.

Figure 3B:
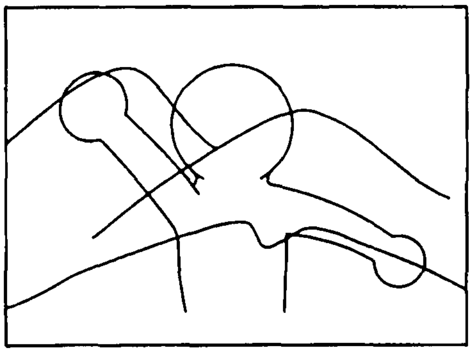
FIG. 3B is a schematic view showing another composite image of content and a user.
Figure 3C:
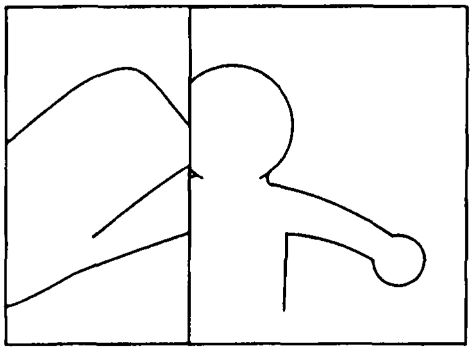
FIG. 3C is a schematic view showing another composite image of content and a user.

On the cross-fade mode of FIG. 3B, the user image (of user A or X) is shown alpha-blended with the content image. Such cross-fade mode may be used illustratively when a user points to a particular position or area on the content image.

On the wipe mode of FIG. 3B, a user image appears in a manner wiping the content image in a predetermined direction.

The mode in which to mix content and user images into a composite may be changed as needed. It is also possible to adopt other suitable modes than those discussed above in displaying content and user images.

Figure 4:
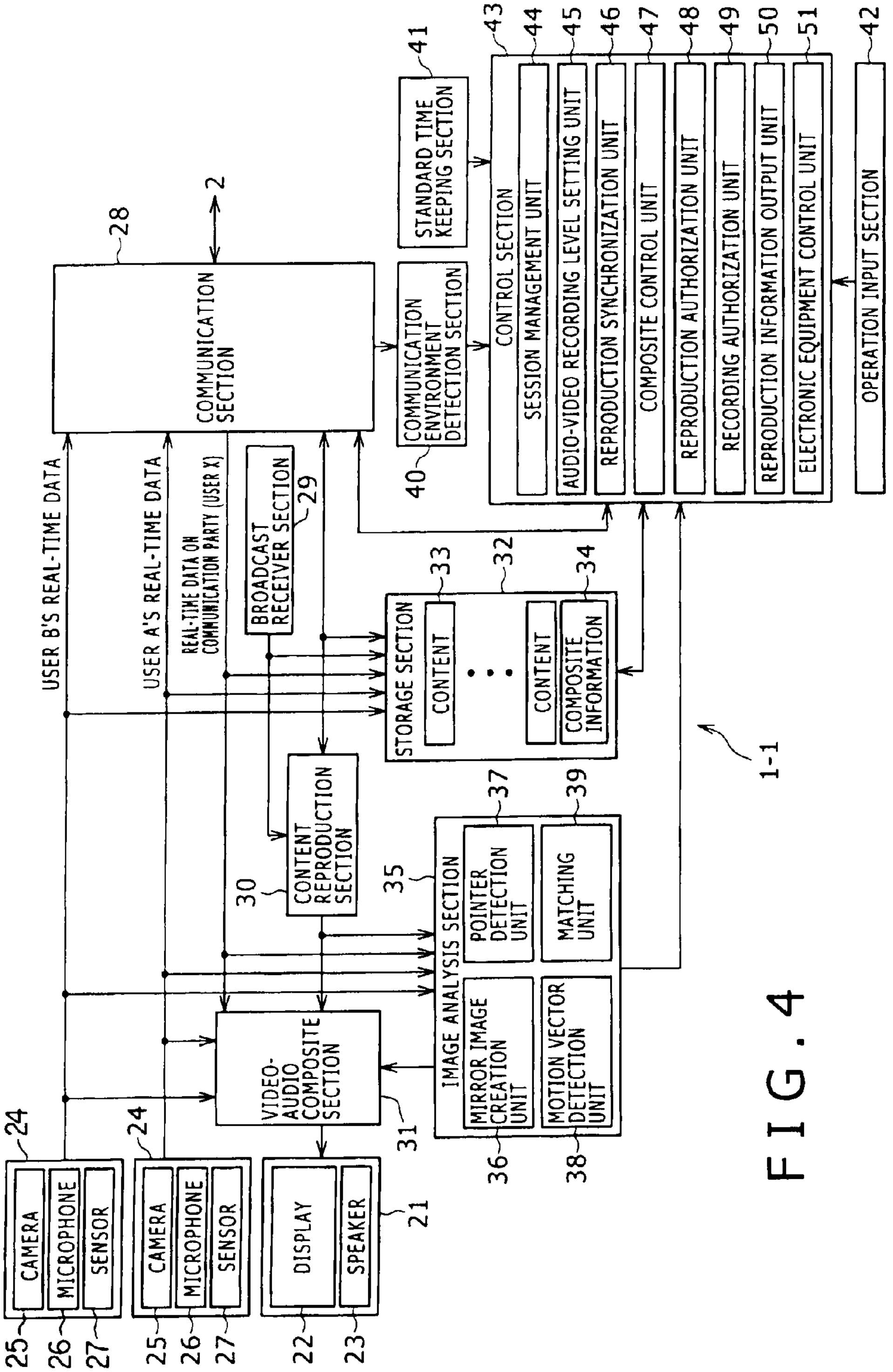
FIG. 4 is a block diagram showing a typical structure of a communication apparatus included in FIG. 1.

The manner in which the images and sounds of contents and users are mixed into a composite is recorded as composite information 34 (FIG. 4). Illustratively, records are taken of the distinctions between picture-in-picture mode, cross-fade mode, and wipe mode; of the sizes and positions of small-sized screens in picture-in-picture mode; of degrees of transparency in alpha-blended images with cross-fade mode in effect; and of sound volumes in use.

Returning to FIG. 1, the communication network 2 is a wide-area data communication network such as the Internet. In response to requests from the communication apparatus 1, a content delivery server 3 delivers contents to the communication apparatus 1 through the communication network 2. An authentication server 4 performs authentication, charging, and other processes when the user of the communication apparatus 1 utilizes this communication system.

Broadcasting equipment 5 broadcasts contents such as TV programs. Each communication apparatus 1 is designed to receive and reproduce synchronously the contents transmitted by the broadcasting equipment 5. Contents may be broadcast by the broadcasting equipment 5 to the communication apparatus 1 in either wired or wireless fashion. Such broadcasting may be performed alternatively using the communication network 2.

Standard time information delivery equipment 6 broadcasts standard time information (e.g., Greenwich mean time, Japanese standard time) that is used to synchronize internal clocks (i.e., standard time keeping section 41 in FIG. 4) of the communication apparatus 1. The standard time information may be broadcast by the standard time information delivery equipment 6 to the communication apparatus 1 in either wired or wireless fashion. Such broadcasting may be performed alternatively using the communication network 2.

A typical structure of the communication apparatus 1-1 will now be described in detail with reference to FIG. 4.

In the communication apparatus 1-1, an output section 21 is made up of the display 22 and a speaker 23. The output section 21 inputs video and audio signals from a video-audio composite section 31 and outputs the images and sounds reflecting the input video and audio signals.

An input section 24 is constituted by a camera 25 for picking up images (moving or still pictures) of a user, by a microphone 26 for picking up the user's voice, and by a sensor 27 for detecting ambient condition information (brightness, temperature, humidity, etc.) about the user. The input section 24 turns the acquired moving images, sounds and ambient information into real-time (RT) data about the user and outputs the data to a communication section 28 and a storage section 32. The camera 25 is capable of measuring the distance to the object being imaged (i.e., user). The input section 24 also outputs the acquired images and sounds of the user to the video-audio composite section 31. Furthermore, the input section 24 outputs the acquired images to an image analysis section 35. Illustratively, a plurality of input sections 24 (two in the structure of FIG. 4) may be installed and pointed at a plurality of users (e.g., users A and B in FIG. 1).

The communication section 28 inputs the real-time data about the user A from the input section 24 and outputs the input data to the communication apparatus 1-2 of the communicating party through the communication network 2. The communication section 28 also receives the real-time data about the user X from the communication apparatus 1-2 and outputs the received data to the video-audio composite section 31, storage section 32, and image analysis section 35. The communication section 28 further receives contents that have been delivered from the communicating party's communication apparatus 1-2 or from the content delivery server 3 through the communication network 2 and outputs the received contents to a content reproduction section 30 and the storage section 32. In addition, the communication section 28 sends contents 33 held in the storage section 32 or operation information created by an operation information output unit 50 to the communication apparatus 1-2 through the communication network 2.

A broadcast receiver section 29 receives TV broadcast signals from the broadcasting equipment 5 and outputs to the content reproduction section 30 the content in the form of TV programs derived from the received broadcast signals. The content reproduction section 30 reproduces: contents in the form of TV programs received by the broadcast receiver section 29; contents received by the communication section 28; and contents retrieved from the storage section 32. The images and sounds of the content thus obtained are output to the video-audio composite section 31 and image analysis section 35.

The video-audio composite section 31 alpha-blends an image of the content inputted from the content reproduction section 30, a user image, and an OSD (on-screen display)

image into a composite and outputs the resulting video signal to the output section 21. The video-audio composite section 31 further composites the sound of the content from the content reproduction section 30 with the user's voice, and outputs the resulting audio signal to the output section 21.

The storage section 32 stores: the real-time data about the user (e.g., user A) supplied from the input section 24; the real-time data about the communicating party (e.g., user X) sent from the communication section 28; the contents representative of the TV programs received by the broadcast receiver section 29; and the contents fed from the communication section 28. The storage section 32 further stores composite information 34 created by a composite control unit 47.

The image analysis section 35 analyzes content images input from the content reproduction section 30 as well as user images (including images sent from the communication apparatus 1-2) in terms of brightness and luminance, and outputs the result of the analysis to the composite control unit 47. A mirror image creation unit 36 of the image analysis section 35 creates mirror images of the user images (including the image from the communication apparatus 1-2). A pointer detection unit 37 extracts an image of a pointer on the user pointing to a particular position with his or her wrist or fingertips from the user images (including the image from the communication apparatus 1-2), on the basis of the user's motion vector detected by a motion vector detection unit 38. If the image coming from the input section 24 includes a plurality of users, then the pointer detection unit 37 detects a plurality of pointers in association with the users. The motion vector detection unit 38 detects motion vector elements depicting the user's motions from the user images (including the image from the communication apparatus 1-2), and identifies a starting point and a locus of each user motion. A matching unit 39 checks to determine whether the detected motion vector of the user matches with any one of predicted user motions, and outputs the result of the check to a control section 43 as motion vector matching information.

A communication environment detection section 40 monitors the environment of communication (i.e., communication speed, delay time, etc.) between the communication section 28 and the communication apparatus 1-2 through the communication network 2, and outputs what is detected to the control section 43. The standard time keeping section 41 regulates the standard time it keeps based on the standard time information supplied from the standard time information delivery equipment 6, and provides the standard time to the control section 43. An operation input section 42 is illustratively composed of a remote controller that inputs to the control section 43 an operation signal representing the user's operation.

The control section 43 controls the components of the communication apparatus 1-1 based on the operation signal reflecting the user's operation from the operation input section 42 and on the motion vector matching information sent from the image analysis section 35. The control section 43 includes a session management unit 44, an audio-video recording level setting unit 45, a reproduction synchronization unit 46, a composite control unit 47, a reproduction authorization unit 48, a recording authorization unit 49, an operation information output unit 50, and an electronic equipment control unit 51. In FIG. 4, the lines of control emanating from the control section 43 and leading to the components of the communication apparatus 1-1 are omitted.

The session management unit 44 controls the process in which the communication section 28 communicates with the communication apparatus 1-2, content delivery server 3, and authentication server 4 through the communication network 2. In response to the user's setting operations, the audio-video recording level setting unit 45 makes settings specifying whether the real-time data about the user A, etc., acquired by the input section 24 can be reproduced and/or recorded by the communication apparatus 1-2 of the communicating party, and how many times the data can be recorded if it is specified to be recordable. The setting information is sent from the communication section 28 to the communication apparatus 1-2. The reproduction synchronization unit 46 controls the broadcast receiver section 29 and content reproduction section 30 in such a manner as to ensure reproduction of the same content in synchronism with the communication apparatus 1-2 of the communicating party.

Given the result of the analysis by the image analysis section 35, the composite control unit 47 controls the video-audio composite section 31 in a manner mixing the images and sounds of the content and users into a composite reflecting the user settings. Based on license information or the like attached to a given content, the reproduction authorization unit 48 determines whether or not the content in question can be reproduced, and controls the content reproduction section 30 accordingly. In keeping with the communicating party's settings or the license information attached to a given content, the recording authorization unit 49 determines whether or not the real-time data about the user and/or the content can be recorded, and controls the storage section 32 accordingly. The operation information output unit 50, responding to the user's operations (e.g., channel changes during TV broadcast reception; start, stop, fast forward, etc., of the content being reproduced), creates operation information including operational details and timestamps and causes the communication section 28 to send the created information to the communication apparatus 1-2 of the communicating party. The operation information is used subsequently for synchronized content reproduction.

The electronic equipment control unit 51 controls electronic equipment (e.g., lighting equipment, air conditioning equipment, etc., not shown) connected (in wired or wireless fashion) to the communication apparatus 1-1 on the basis of the motion vector matching information input from the image analysis section 35.

The detailed structure of the communication apparatus 1-2 is the same as that of the communication apparatus 1-1 depicted in FIG. 4 and thus will not be discussed further.

Figure 5:
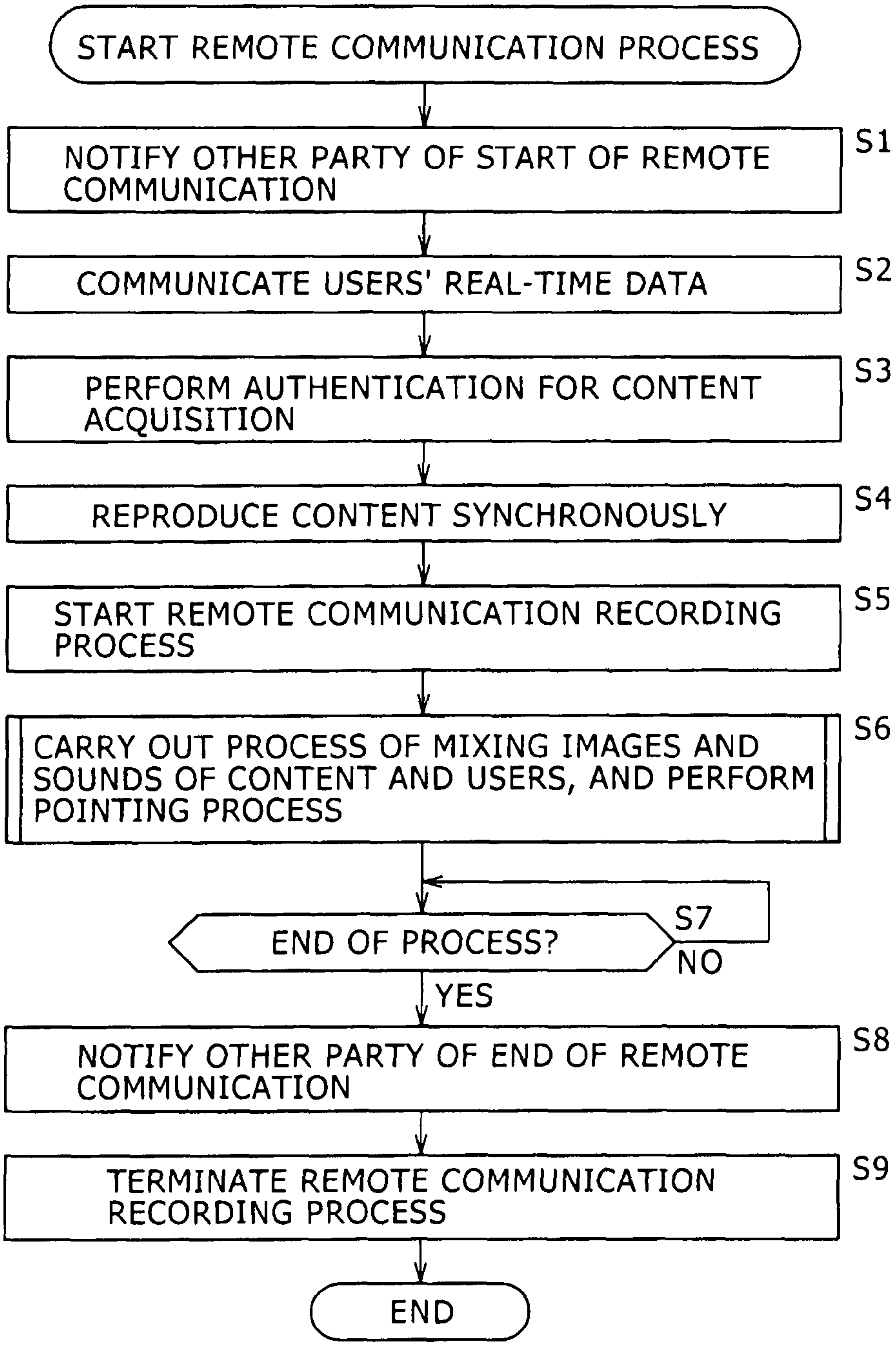
FIG. 5 is a flowchart of steps constituting a remote communication process performed by the communication apparatus.

Described below with reference to the flowchart of FIG. 5 is the remote communication process carried out by the communication apparatus 1-1 with regard to the communication apparatus 1-2.

The remote communication process is started when an operation is performed on the operation input section 42 giving an instruction to start communication with the remotely located communication apparatus 1-2, and the control section 43 is given an operation signal representing the instruction.

In step S1, the communication section 28 under control of the session management unit 44 connects to the communication apparatus 1-2 through the communication network 2 and notifies the communicating party of the start of a remote communication process. Given the notification, the communication apparatus 1-2 acknowledges the onset of the remote communication process and sends back accept of notification to the communication section 28.

In step S2, the communication section 28 under control of the control section 43 starts sending the real-time data about the user A, etc., input from the input section 24, to the communication apparatus 1-2 through the communication network 2. At the same time, the communication section 28 starts receiving the real-time data about the user X sent from the communication apparatus 1-2. The images and sounds included in the transmitted real-time data about the user A, etc., as well as the images and sounds included in the received real-time data about the user X are inputted to the video-audio composite section 31.

In step S3, the communication section 28 under control of the session management unit 44 connects to the authentication server 4 through the communication network 2 and proceeds with an authentication process for content acquisition. Following the successful authentication process, the communication section 28 accesses to the content delivery server 3 through the communication network 2 and acquires the user-designated content. At this point, it is assumed, the communication apparatus 1-2 carries out like processes and acquires the same content.

Step S3 may be skipped if TV broadcast contents are to be received or if any content already stored in the storage section 32 is to be retrieved and reproduced.

In step S4, the content reproduction section 30 under control of the reproduction synchronization unit 46 starts reproducing the content in synchronism with the communication apparatus 1-2.

In step S5, the storage section 32 starts a remote communication recording process. More specifically, the storage section 32 starts recording the images and sounds of the content that has started to be reproduced, images and sounds included in the transmitted real-time data about the user A, etc., images and sounds in the received real-time data about the user X, and composite information created by the composite control unit 47 in a manner specifying how the images and sounds are mixed into a composite.

In step S6, the video-audio composite section 31 under control of the composite control unit 47 mixes into a composite the images and sounds of the reproduced content, images and sounds included in the transmitted real-time data about the user A, etc., and images and sounds in the received real-time data about the user X in one of three ways illustrated in FIGS. 3A through 3C. The resulting video and audio signals are sent from the video-audio composite section 31 to the output section 21. The output section 21 displays an image reflecting the supplied video signal and outputs the sound corresponding to the supplied audio signal. At this point, the communication of images and sounds between the users is started along with the synchronized reproduction of the content on their apparatuses.

Also in step S6, in parallel with the processing of the video-audio composite section 31 and the like, the pointer detection unit 35 in the image analysis section 35 detects a pointer(s) of the user A, etc., from the images included in the real-time data about the user A, etc., and displays the pointer(s) on the screen (i.e., pointing process).

In step S7, the control section 43 checks to determine whether the user has performed an operation giving an instruction to end the remote communication process. The control section 43 waits for the operation to be carried out. When the instruction to end the remote communication process is found to be given, control is passed on to step S8.

In step S8, the communication section 28 under control of the session management unit 44 connects to the communication apparatus 1-2 through the communication network 2 and notifies the communication apparatus 1-2 of the end of the remote communication process. Given the notification, the communication apparatus 1-2 acknowledges the termination of the remote communication process and sends back accept of notification to the communication section 28.

In step S9, the storage section 32 ends the communication recording process. All that has been recorded so far, including the reproduced content, images and sounds included in the real-time data about the user A, etc., images and sounds in the received real-time data about the user X, and composite information 34, will be used when this remote communication process is subsequently reproduced.

The description just completed was about the remote communication process carried out by the communication apparatus 1-1 with respect to the communication apparatus 1-2.

Described below with reference to FIGS. 6A through 8C are three typical cases in which the pointing process of step S6 is carried out during the remote communication process discussed above. In the first case, the communication apparatus 1-1 is operated by a single user A; in the second case, the communication apparatus 1-1 provided with a plurality of input sections 24 is operated by a plurality of users A and B; and in the third case, the communication apparatus 1-1 is operated by the multiple users A and B who are imaged by a single input section 24.

Figure 6A:
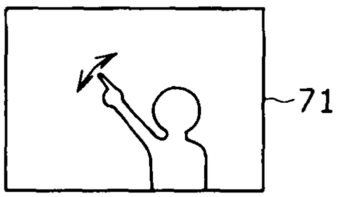
FIG. 6A is an explanatory view outlining a pointing process of a first case.
Figure 6B:
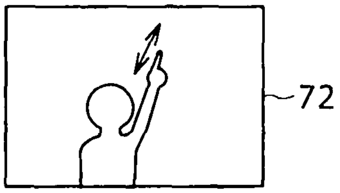
FIG. 6B is another explanatory view outlining the pointing process of the first case.
Figure 6C:
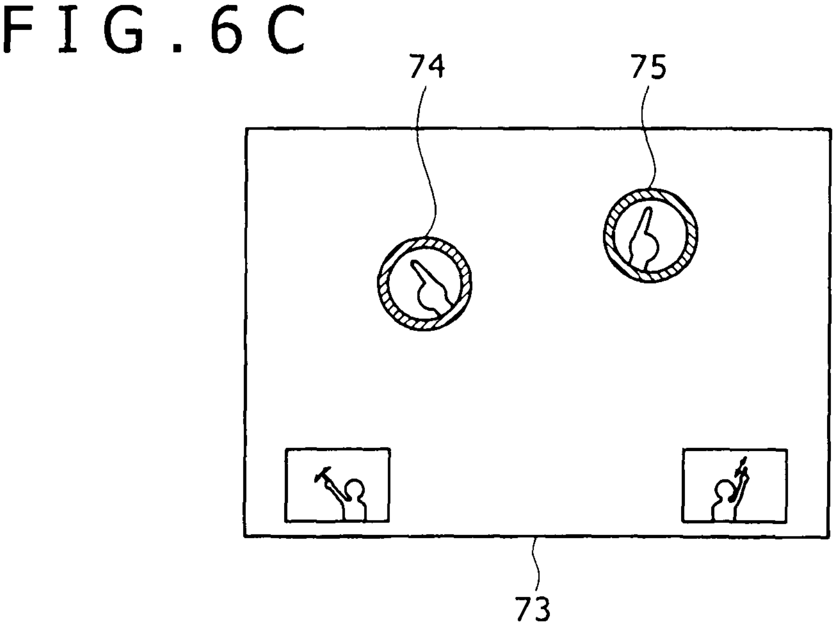
FIG. 6C is another explanatory view outlining the pointing process of the first case.

FIGS. 6A through 6C outline the first case of the pointing process. The user A, watching the content image and an image of himself or herself in cross-fade mode (as illustrated in FIG. 3B) on the display 22, moves the fingertips as shown in FIG. 6A in a manner pointing to a desired position in the content image being displayed. A motion vector of the user's motion is then detected, and an area containing the position where the motion vector has been spotted is cut off from the user A's image 71. The extracted user's image is turned into a pointer 74 of the user A that is alpha-blended into the content image as shown in FIG. 6C. The user A's image 71 is superposed as a small-sized screen onto the content image.

Likewise, a motion vector of the user X is detected from the user X's image 72 shown in FIG. 6B. A pointer 75 of the user X is extracted and alpha-blended into the content image. The user X's image 72 is superposed as a small-sized screen onto the content image. The process in which to detect the user X's motion from the user X's image 72 and to extract the user X's pointer may be performed by the communication apparatus 1-1, or carried out by the communication apparatus 1-2 with the result of the process provided to the communication apparatus 1-1.

On an image 73 where the content image (not shown) and the users' pointers are blended as shown in FIG. 6C, the pointer rims are differentiated in color or in pattern so as to distinguish the user A's pointer 74 from the user X's pointer 75. Alternatively, the users' pointers may be distinguished from one another by painting the pointers in different colors or by displaying near each pointer a character(s), a symbol(s), a marking(s), or a thumbnail (i.e., miniature) image of the user in question.

FIGS. 7A through 7D outline the pointing process of the second case. In this case, it is assumed that a plurality of input sections 24 attached to the communication apparatus 1-1 have previously stored information for identifying the respectively assigned users.

Figure 7A:
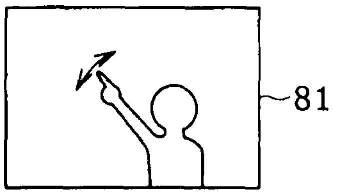
FIG. 7A is an explanatory view outlining a pointing process of a second case.

The user A, watching the content image and an image of himself or herself in cross-fade mode (as illustrated in FIG. 3B) on the display 22, moves the fingertips as shown in FIG. 7A in a manner pointing to a desired position in the content image being displayed. A motion vector of the user's motion is then detected, and an area containing the position where the motion vector has been spotted is cut off from the user A's image 81. The extracted user's image is turned into a pointer 85 that is alpha-blended into the content image as shown in FIG. 7C. The user A's image 81 is superposed as a small-sized screen onto the content image.

Figure 7B:
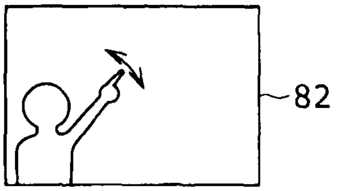
FIG. 7B is another explanatory view outlining the pointing process of the second case.
Figure 7C:
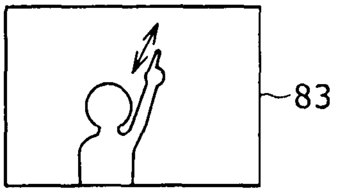
FIG. 7C is another explanatory view outlining the pointing process of the second case.

Likewise, a motion vector of the user B is detected from the user B's image 82 shown in FIG. 7B. A pointer 86 of the user B is extracted and alpha-blended into the content image. The user B's image 82 is superposed as a small-sized screen onto the content image.

Furthermore, a motion vector of the user X is detected in like manner from the user X's image 83 shown in FIG. 7C. A pointer 87 of the user X is extracted and alpha-blended into the content image. The user X's image 83 is superposed as a small-sized screen onto the content image. The process in which to detect the user X's motion from the user X's image 83 and to extract the user X's pointer may be performed by the communication apparatus 1-1, or carried out by the communication apparatus 1-2 with the result of the process provided to the communication apparatus 1-1.

Figure 7D:
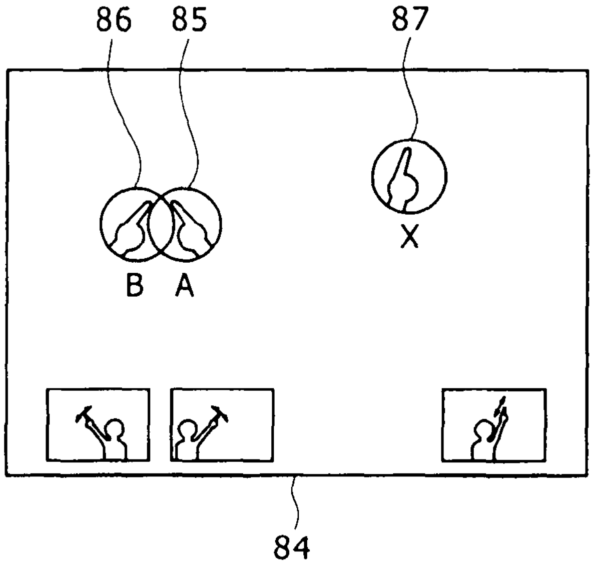
FIG. 7D is another explanatory view outlining the pointing process of the second case.

On an image 84 where the content image (not shown) and the users' pointers are blended as shown in FIG. 7D, a user-identifying character is displayed near each user pointer so as to distinguish the user A's pointer 85, the user B's pointer 86, and the user X's pointer 87 from one another. Alternatively, the users' pointers may be distinguished from one another by painting the pointers or their rims in different colors or by displaying near each pointer a symbol(s), a marking(s), or a thumbnail image of the user in question.

Figure 8A:
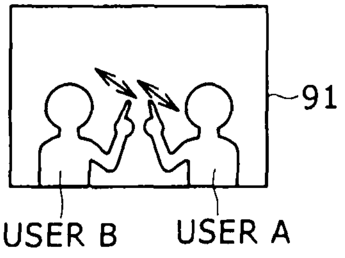
FIG. 8A is an explanatory view outlining a pointing process of a third case.
Figure 8B:
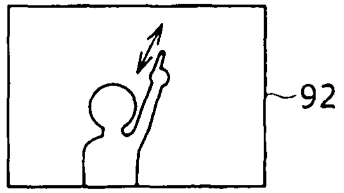
FIG. 8B is another explanatory view outlining the pointing process of the third case.
Figure 8C:
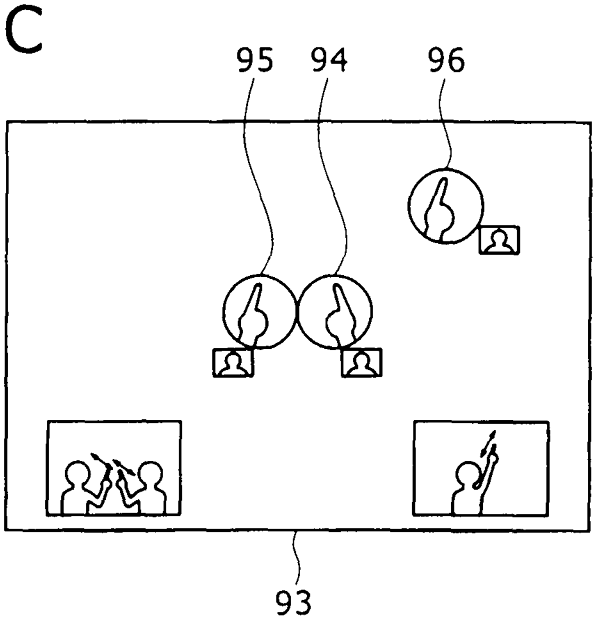
FIG. 8C is another explanatory view outlining the pointing process of the third case.

FIGS. 8A through 8C outline the pointing process of the third case. In this case, a single input section 24 attached to the communication apparatus 1-1 images the users A and B simultaneously. An image 91 of the users A and B such as one shown in FIG. 8A is then input.

The users A and B, watching the content image and an image of themselves in cross-fade mode (as illustrated in FIG. 3B) on the display 22, move the fingertips as shown in FIG. 8A in a manner pointing to desired positions in the content image being displayed. Motion vectors of the user A's and user B's motions are then detected, and areas containing the positions where the motion vectors have been spotted are cut off from the users' image 91. The extracted users' images are turned into the user A's pointer 94 and user B's pointer 95 which are alpha-blended into the content image as shown in FIG. 8C. The image 91 of the users A and B is superposed as a small-sized screen onto the content image.

Figure 9:
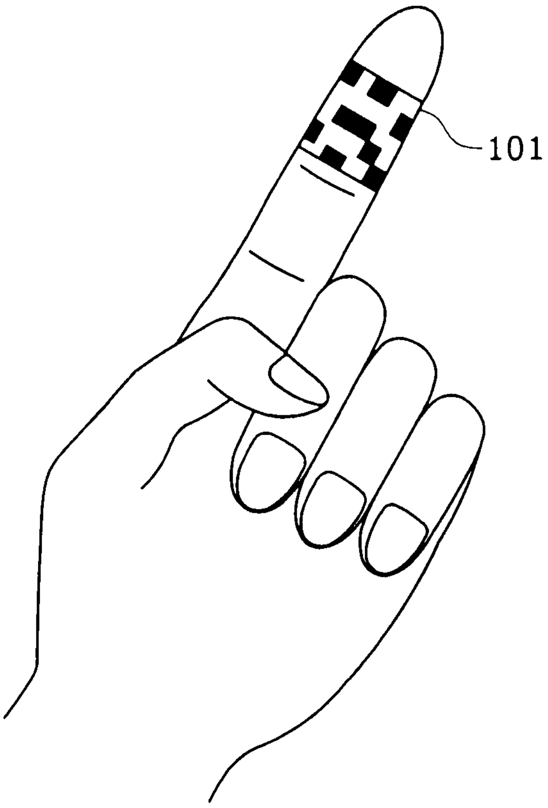
FIG. 9 is a schematic view showing a typical Cyber Code for identifying a user.

The two pointers extracted from the single image 91 may be associated respectively with the users A and B by having each user wear a different Cyber Code (2D code) 101 on his or her fingertip, as shown in FIG. 9. In operation, the Cyber Code 101 is read from the image 91 and analyzed for pointer display. Alternatively, the Cyber Code 101 may be replaced by a ring of a different color worn by each user.

Likewise, a motion vector of the user X is detected from the user X's image 92 shown in FIG. 8B. A pointer 96 of the user X is extracted and alpha-blended into the content image. The user X's image 92 is superposed as a small-sized screen onto the content image. The process in which to detect the user X's motion from the user X's image 92 and to extract the user X's pointer may be performed by the communication apparatus 1-1, or carried out by the communication apparatus 1-2 with the result of the process provided to the communication apparatus 1-1.

On an image 93 where the content image (not shown) and the users' pointers are blended as shown in FIG. 8C, a user-identifying thumbnail image is displayed near each user pointer so as to distinguish the user A's pointer 94, the user B's pointer 95, and the user X's pointer 96 from one another. Alternatively, the users' pointers may be distinguished from one another by painting the pointers or their rims in different colors or patterns or by displaying near each pointer a character(s), a symbol(s), or a marking(s) for identification purposes.

Figure 10:
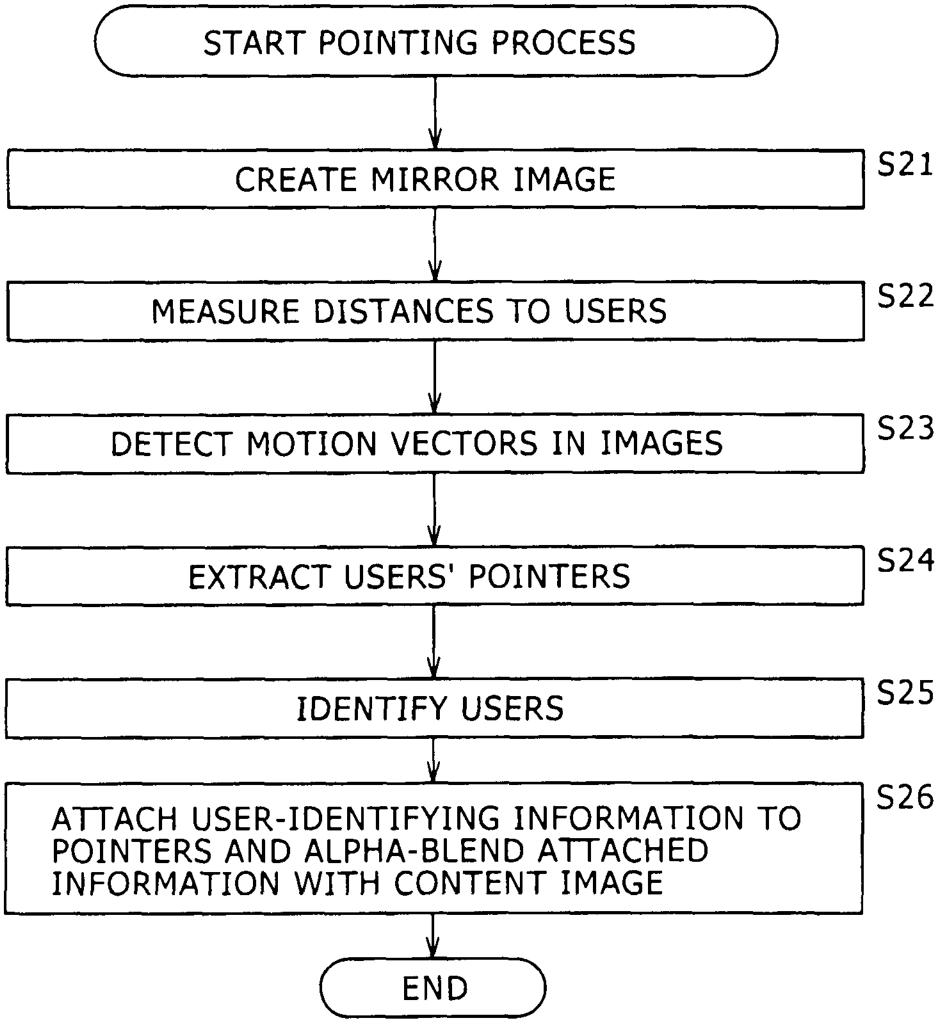
FIG. 10 is a flowchart of steps constituting the pointing process of the third case.

Described below with reference to the flowchart of FIG. 10 is the pointing process of the third case illustrated in FIGS. 8A through 8C, i.e., a process in which the communication apparatus 1-1 displays the pointers of the users A, B and C. This pointing process is started when the user A or B performs an operation giving an instruction to start the process.

In step S21, the mirror image creation unit 36 of the communication apparatus 1-1 creates a mirror image of the image covering the users A and B input from the input section 24. The video-audio composite section 31 alpha-blends the created mirror image and the content image into a cross-faded image such as one shown in FIG. 3B, and outputs the resulting image to the display 22.

At this point, the users A and B, watching the cross-faded image on the display 22, may move their fingertips in a manner pointing to desired positions on the content image. In step S22, the camera 25 in the input section 21 measures distances to the objects being imaged (i.e., users A and B) and outputs the measurements to the image analysis section 35. In step S23, the motion vector detection unit 38 detects motion vectors of the users A and B from their image.

In step S24, the pointer detection unit 37 extracts the pointers (e.g., fingertips, wrists, etc.) of the users A and B from their image based on the distances to the users A and B measured in step S22 and on the motion vectors of the users A and B from their image obtained in step S23. In this case, two pointers are extracted. In step S25, the pointer detection unit 37 identifies the users corresponding to the two extracted pointers. More specifically, the users A and B may be prompted to wear different Cyber Codes on their fingertips. The Cyber Codes are then read from the pointer images in a manner distinguishing the user A from the user B.

In step S26, the video-audio composite section 31 attaches user-identifying information (e.g., pointer rings painted in different colors; display of characters, markings, symbols, or thumbnail images) to the pointers of the users A and B, and alpha-blends the attached information with the content image.

Steps S21 through S25 described above are also carried out on the user X's image input from the input section 24 of the communication apparatus 1-2, by either the communication apparatus 1-1 or the communication apparatus 1-2. Steps S26 is then performed on the resulting representation by the communication apparatus 1-1.

Ultimately, the display 22 of the communication apparatus 1-1 displays a composite image such as one shown in FIG. 8C. The description just completed was about how the pointing process is carried out.

The first case depicted in FIGS. 6A through 6C and the second case illustrated in FIGS. 7A through 7D can be readily understood in detail from the above description made with reference to FIG. 10, with the exception of step S25 being skipped. Thus the first and the second cases will not be described further.

In the foregoing description, the communication apparatus 1-2 was shown operating as a slave to the communication apparatus 1-1 which acts as a master. Alternatively, this master-slave relationship can be reversed or otherwise changed as needed.

In the foregoing description, one communication apparatus 1 (i.e., communication apparatus 1-2) was shown operating as the only slave to the communication apparatus 1-1 acting as the master. Alternatively, a plurality of communication apparatuses 1 may be arranged to operate as slaves to the communication apparatus 1-1. Such master-slave relations can be reversed or otherwise changed as needed among the multiple communication apparatuses 1.

The series of steps or processes performed by the communication apparatus 1 as described above may be executed either by hardware or by software. For the software-based processing to take place, the programs constituting the software may be either incorporated beforehand in dedicated hardware of a computer for program execution or installed upon use from a suitable recording medium into a general-purpose personal computer such as one shown in FIG. 11 capable of executing diverse functions based on the installed programs.

Figure 11:
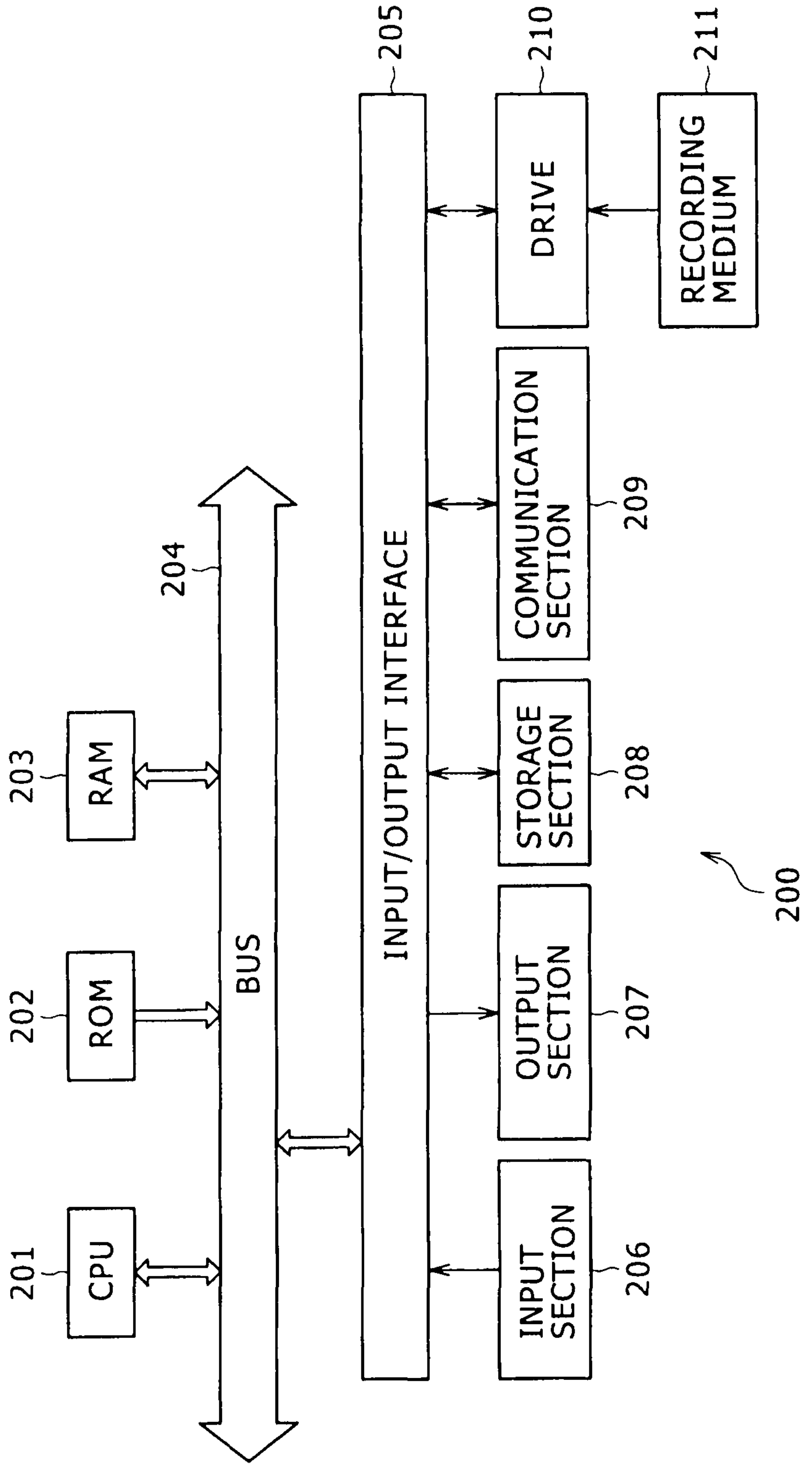
FIG. 11 is a block diagram showing a typical structure of a general-purpose personal computer.

A personal computer 200 shown in FIG. 11 incorporates a CPU (central processing unit) 201. An input/output interface 205 is connected to the CPU 201 via a bus 204. The bus 204 is also connected to a ROM (read only memory) 202 and a RAM (random access memory) 203.

The input/output interface 205 is connected to an input section 206, an output section 207, a storage section 208, and a communication section 209. The input section 206 is made up of a keyboard, a mouse, and/or other elements by which the user inputs operation commands. The output section 207 displays images and outputs sounds. The storage section 208 is typically composed of a hard disc drive that holds programs and data. The communication section 209 performs communication processes through a network such as the Internet. The input/output interface 205 is further connected to a drive 210 that writes and reads data to and from a recording medium 211 such as magnetic discs (including flexible discs), optical discs (including CD-ROM (compact disc-read only memory) and DVD (digital versatile disc)), magneto-optical discs (including MD (min-disc)), or semiconductor memories.

The programs for causing the personal computer 200 to take over the processes for execution by the communication apparatus 1 as described above are held on the recording medium 211 that is brought to the personal computer 200. With the programs placed into the recording medium 211, the programs are retrieved by the drive 210 from the recording medium 211 and installed onto the hard disc drive in the storage section 208. The programs installed in the storage section 208 are loaded into the RAM 203 for execution as instructed by the CPU 201 responding to the commands entered through the input section 206 by the user.

In this description, the steps performed on the basis of the installed programs represent not only the processes that are to be carried out in the depicted sequence (i.e., on a time series basis) but also processes that may be performed parallelly or individually and not chronologically.

The programs may be executed either by a single computer or by a plurality of computers in distributed fashion. The programs may also be transferred to a remotely located computer or computers for execution thereby.

In this description, the term "system" refers to an entire configuration made up of a plurality of components.

The invention claimed is:

1. An information processing apparatus for reproducing content data which is viewed by a plurality of users simultaneously, the information processing apparatus comprising:
- a single imaging circuit configured to pick up an image of a plurality of users of the information processing apparatus simultaneously; and
- circuitry configured to
  - reproduce the content data, generate a mirror image of the image of the plurality of users picked up by the imaging circuit,
  - detect a position of a pointer of at least one of the plurality of users in the mirror image,
  - measure a distance from the information processing apparatus to the plurality of users
  - extract an area containing the detected position of the pointer of the at least one of the plurality of users from the mirror image, based on the measured distance to the plurality of users, and
  - composite the extracted area from the mirror image onto an image of the content data reproduced so that the pointer appears partially transparent on the image of the content data.

2. The information processing apparatus according to claim 1, wherein the circuitry is further configured to composite by alpha-blending the extracted area in the mirror image onto the image of the content data reproduced.

3. The information processing apparatus according to claim 1, wherein the pointer is at least a part of a hand or a finger of one of the plurality of users.

4. The information processing apparatus according to claim 1, wherein the circuitry is configured to detect a motion vector from the mirror image to detect the position of the pointer.

5. The information processing apparatus according to claim 1, wherein the circuitry is further configured to receive through a network the content data to be reproduced.

6. The information processing apparatus according to claim 1, wherein the circuitry configured to composite user-identifying information together with the extracted area.

7. The information processing apparatus according to claim 1, wherein the circuitry is further configured to send real-time data to another information processing apparatus through a network.

8. The information processing apparatus according to claim 7, wherein the real-time data is generated based on the image picked up by the imaging circuit, a user's voice picked up by a microphone, or ambient condition information detected by a sensor.

9. An information processing method for an image processing apparatus to reproduce content data which is viewed by a plurality of users simultaneously, the method comprising:
- picking up an image of a plurality of users of an information processing apparatus simultaneously using a single imaging circuit;
- generating a mirror image of the image of the plurality of users;
- detecting a position of a pointer of at least one of the plurality of users in the mirror image, the detecting including measuring a distance from the information processing apparatus to the plurality of users;
- extracting an area containing the detected pointer of the at least one of the plurality of users from the mirror image based on the measured distance to the plurality of users; and
- compositing the extracted area in the mirror image onto an image of the content data reproduced so that the pointer appears partially transparent on the image of the content data; and reproducing the content data with the extracted area composited thereover.

10. The method according to claim 9, further comprising:
- compositing by alpha-blending the extracted area in the mirror image onto the image of the content data reproduced.

11. The method according to claim 9, wherein the pointer is at least a part of a hand or a finger of one of the plurality of users.

12. The method according to claim 9, further comprising: detecting a motion vector from the mirror image to detect the position of the pointer.

13. The method according to claim 9, further comprising: receiving through a network the content data to be reproduced.

14. The method according to claim 9, further comprising: compositing user-identifying information together with the extracted area.

15. The method according to claim 9, further comprising: sending real-time data to another information processing apparatus through a network.

16. The method according to claim 15, further comprising: generating the real-time data based on the image picked up, a user's voice picked up by a microphone, or ambient condition information detected by a sensor.

* * * * *